United States Patent [19]

Livera

[11] 4,283,214
[45] Aug. 11, 1981

[54] GOB FEED DIAL FOR DUAL GLASS BASE MACHINE

[75] Inventor: Phillip A. Livera, Bloomfield, N.J.

[73] Assignee: Westinghouse Electric Corp., Pittsburgh, Pa.

[21] Appl. No.: 119,684

[22] Filed: Feb. 8, 1980

[51] Int. Cl.³ .............................................. C03B 7/08
[52] U.S. Cl. ..................................... 65/70; 65/75; 65/127; 65/164; 65/329; 65/334
[58] Field of Search ............... 65/70, 75, 127, 164, 65/329, 332, 334

[56] References Cited

U.S. PATENT DOCUMENTS

| | | |
|---|---|---|
| 847,696 | 3/1907 | Riling et al. ........................ 65/334 |
| 2,422,413 | 6/1947 | Hanlon. |
| 2,887,825 | 5/1959 | Spaller ............................... 65/334 |
| 2,957,276 | 10/1960 | Spaller ............................... 65/334 |
| 4,162,152 | 7/1979 | Petro ................................. 65/164 |

Primary Examiner—Arthur D. Kellogg
Attorney, Agent, or Firm—B. R. Studebaker

[57] ABSTRACT

A method and apparatus for forming and delivering insulating glass in gob form to a lamp base making machine from a continuous stream of molten glass. A rotating dial severs the glass stream into uniform gobs and during rotation forms the gobs into a ball like form and delivers the gobs to a pair of radially spaced drop points for delivery to the base shells on an indexing base making machine.

10 Claims, 7 Drawing Figures

GOB FEED DIAL FOR DUAL GLASS BASE MACHINE

BACKGROUND OF THE INVENTION

A lamp base for an incandescent lamp comprises a metallic threaded shell, a central eyelet and insulating glass which serves to insulate the eyelet from the base shell as well as secure the eyelet centrally in the open bottom of the base shell. In the automated manufacture of incandescent lamp bases, the eyelet and the shell are placed in a nest on an indexing turret of the base making machine and a gob of molten glass of predetermined size and viscosity is then delivered to the nest. A glass plunger assembly then forms the glass and spreads the eyelet flanges embedding them into the glass as the glass hardens to form the interconnection between the eyelet and the base shell while providing the required insulation between the two parts. Prior art turrets with a single nest at each of the indexing stations on the base turret could be fed from a single stream of glass by severing the glass stream and while forming a ball with the next glass stream the prior gob of glass was delivered directly into the nest.

In order to speed up the manufacture of bases on a single base making machine, a second ring of nests were provided on the turret in order that each index would produce two bases instead of one. U.S. Pat. No. 2,957,276 to A. L. Spaller illustrates the use of two separate glass streams to deliver glass gobs to the side-by-side nests at each index location of the turret. Since the viscosity of the glass gob when it reaches the nest is critical and is effected by time and delivery distances from the furnace orifices from which the glass stream flows, having two separate glass streams doubles the problem of maintaining the glass between its critical parameters. By employing a single glass stream and severing that glass stream in order to delivery glass gobs simultaneously to two different nests on the indexing turret cuts these problems in half.

SUMMARY OF THE INVENTION

In accordance with the present invention an apparatus is provided for forming and delivering insulating glass to an indexing turret on a lamp base making machine by providing a dial support having a horizontally disposed wear plate forming the upper surface thereof and an elongated vertically disposed aperture extending through the dial support and wear plate and having a drive shaft mounted for rotation within the vertical aperture carrying a circular dial mounted to the upper end thereof and positioned for rotation with its bottom side in contact with the wear plate. The circular dial has a plurality of chambers therein with each of the chambers having an opening in the top and bottom surfaces thereof. The openings in the top surface of the dial are located on the first circular locus radially equidistant from the center of the dial while the openings in the bottom surface are alternately located on the first circular locus and on a second circular locus which is radially equidistant from the center of the dial but being a greater distance from the center of the dial then the first circular locus. A glass stream receiving means is positioned over the first locus on the dial for receiving and directing a continuous stream of glass into the openings in the top surface of the dial. The wear plate is constructed and arranged to close off the openings in the bottom surface of the dial for a portion of the rotation of the dial thereby containing the glass within the chambers for a portion of the rotation. A gob guide chute is mounted to the dial support and includes gob guide apertures therethrough which are constructed and arranged to underlie the openings in the bottom of the circular dial whereby glass gobs released from the chambers in the circular dial through the bottom openings will be directed by the gob guide apertures to pre-selected locations on the indexing turret. In operation, the apparatus of this invention repetitively severs a continuous stream of molten glass into gobs of uniform weight and size with a continuously rotating dial. While the gobs of glass are in the dial chambers, these gobs of uniform weight and size are formed into a ball-like shape while being conveyed sequentially to a pair of radially different discharge locations. The ball-like gobs are then discharged from the rotating dial into nests on the indexing turret of the base making machine.

BRIEF DESCRIPTION OF THE DRAWING

Many of the attendent advantages of the present invention will become more readily apparent and better understood as the following detailed description is considered in connection with the accompanying drawing, in which.

DESCRIPTION OF THE PREFERRED EMBODIMENT

Figure 1:
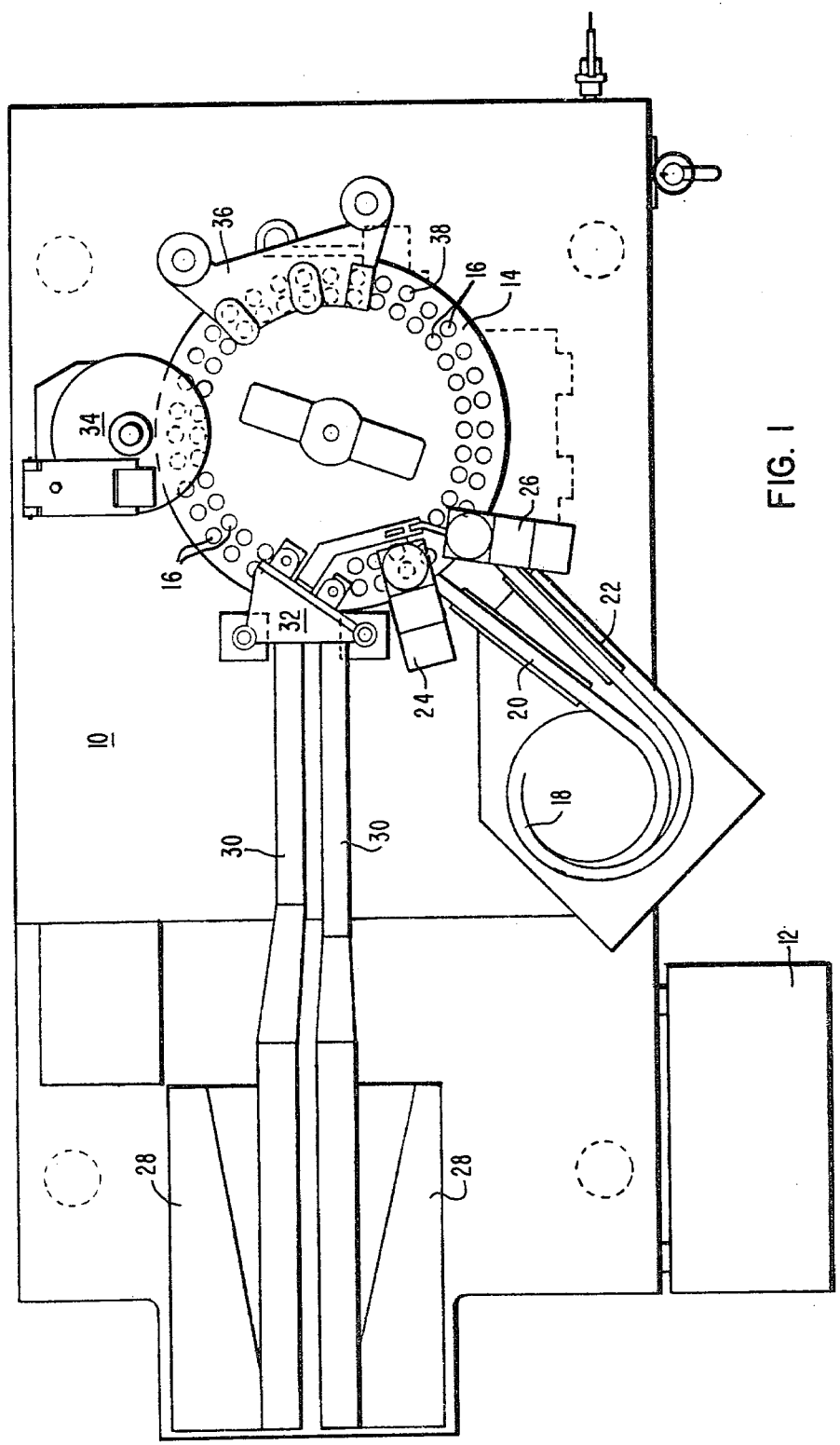
FIG. 1 is a top plan view of a base making machine employing the dual gob feeder of this invention.

Referring now in detail to the drawing wherein like reference characters represent like parts throughout the several view, there is illustrated in FIG. 1 a top plan view of a glass base making machine incorporating the novel dual glass gob feeder of this invention. The general arrangement of the base machine is conventional and includes a base 10, a drive motor 12 which provides the power for the various operative equipments of the glass base machine through various gear reduction mechanisms and includes the drive for the main turret 14 which carries 72 base forming nests 16 therein. The general arrangement of the operative equipment associated with the nests 16 on the glass base machine turret 14 are the vibratory bowl 18 for deliverying eyelets to a pair of eyelet feed tracks 20 and 22 which delivery eyelets to the eyelet placer assemblies 24 and 26. The vibratory bowl and dual tracks delivery eyelets to the eyelet placer assemblies which place a single eyelet into each of the nests 16. The operation of the eyelet feed mechanism is disclosed in detail in copending application Ser. No. 095,819 filed Nov. 19, 1979 by James Petro and owned by the assignee of this invention.

As the nests proceed with a single eyelet in each nest a base shell is fed from the base shell storage hoppers 28 through shell feed tracks 30 to the shell placement assembly 32 which places a shell about the eyelet in each of the nests. The nests containing the eyelet and shell then proceed to the gob feeder assembly 34 which feeds a gob of molten glass to each of the nests, which molten glass proceeds to the bottom of the nest surrounding the eyelet and interior lower portion of the base shell. This gob feeder assembly, generally designated 34, forms the subject matter of this invention.

The nests containing the eyelet, base shell and gob of glass proceed to the glass plunger assembly 36 where the eyelet flanges are spread and embedded into the glass as the glass hardens to form the finished base shell and eyelet assembly. The base assemblies are then ejected from the nests at 38.

Figure 2:
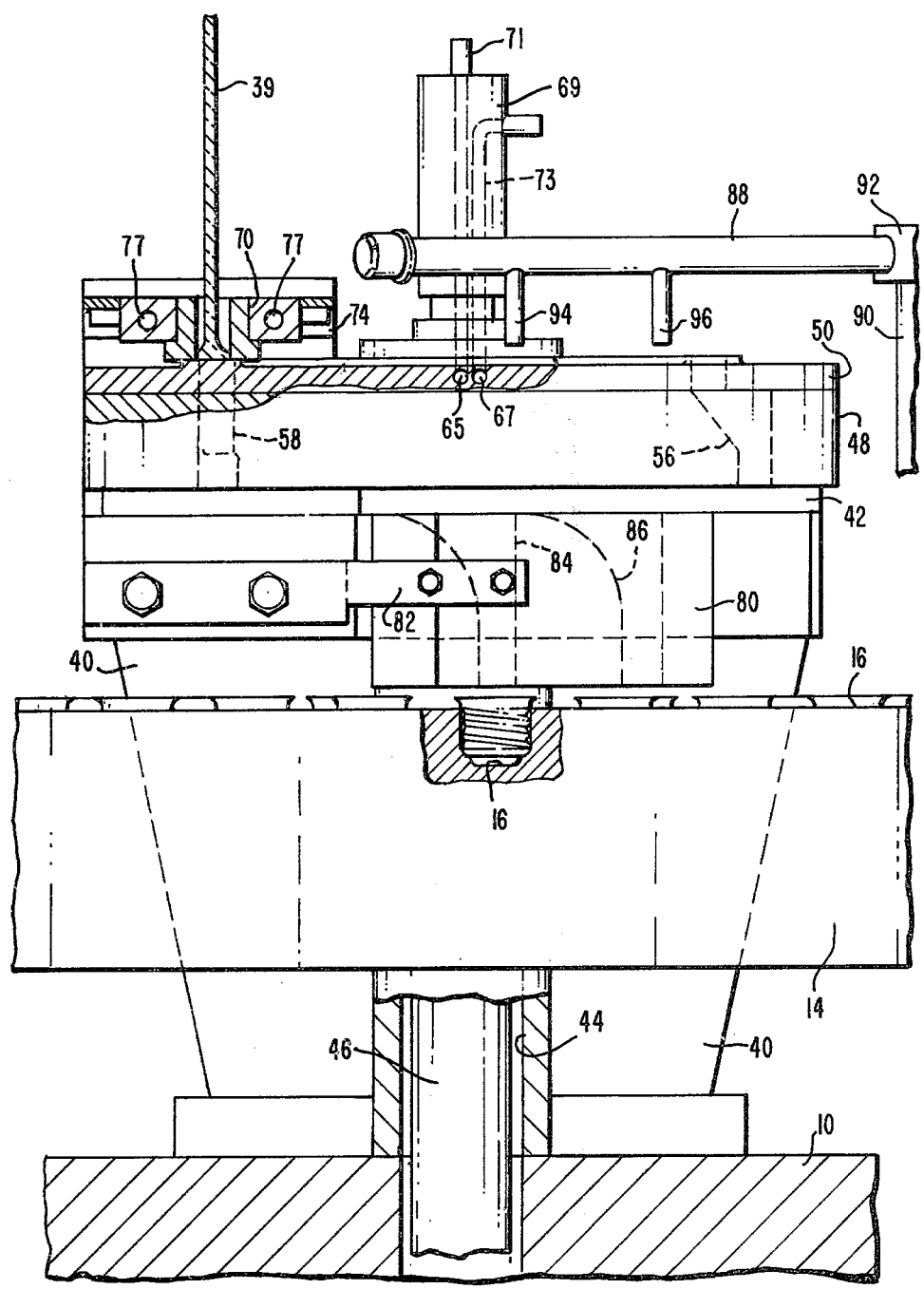
FIG. 2 is a side elevation view, partly in section of the dual gob feed mechanism of this invention.
Figure 3:
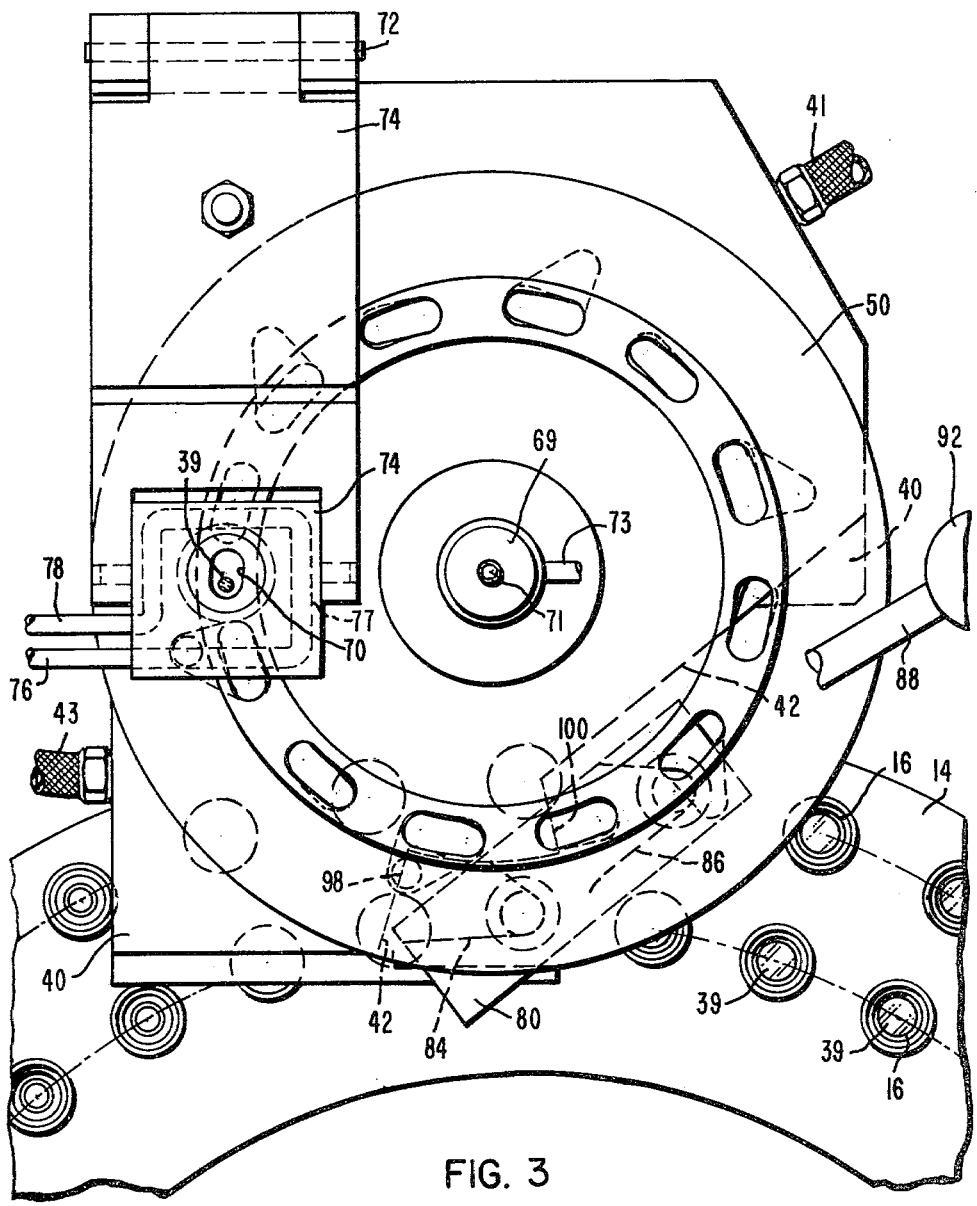
FIG. 3 is a top plan view thereof.

The dual gob feed mechanism of this invention generally designated 34 in FIG. 1 includes a furnace (not shown) including a molten glass metering device of the type disclosed in U.S. Pat. No. 4,162,152 issued July 24, 1979 to James Petro and owned by the assignee of this invention, for deliverying a continuous stream of molten glass 39 to the rotary gob feed mechanism. The rotary gob feed mechanism is best illustrated in FIGS. 2 and 3 and includes a base support member 40 mounted to the base 10 of the base making machine. The base support 40 has at the upper end thereof a wear plate 42 and an aperture 44 extending through both the base member 40 and the wear plate 42. Coolant, preferably water, enters the base support 40 through conduit 41, traverses the base support through a series of conduits (not shown) and exits from the base support through conduit 43. This coolant maintains the wear plate 42 in a cooled condition. A dial drive shaft 46 extends through the aperture 44 and is connected at its lower end to the main machine drive through a reduction coupling (not shown) and has mounted at its upper end the water cooled dial 48 which embodies the principal delivery mechanism of this invention. The dial 48 includes a cover plate 50 and is mounted for intimate engagement with the wear plate 42 when it is rotated by means of the dial drive shaft 46.

Figure 4:
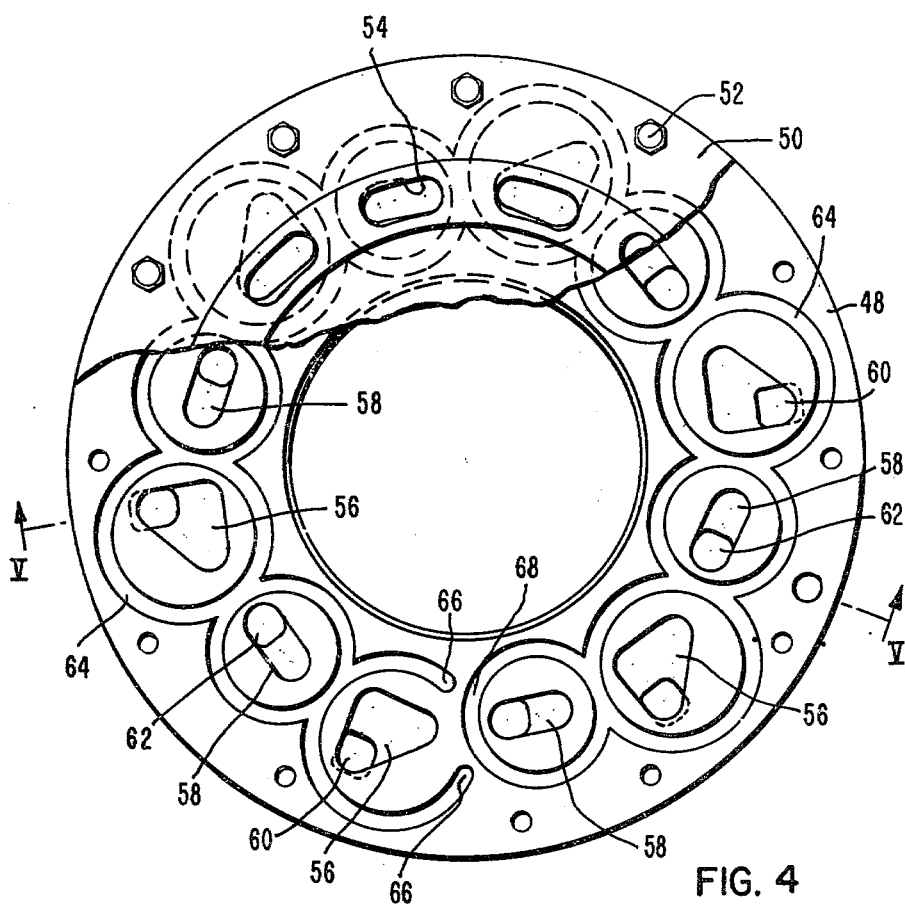
FIG. 4 is a top plan view of the gob feed dial with a portion of the top plate broken away.
Figure 5:
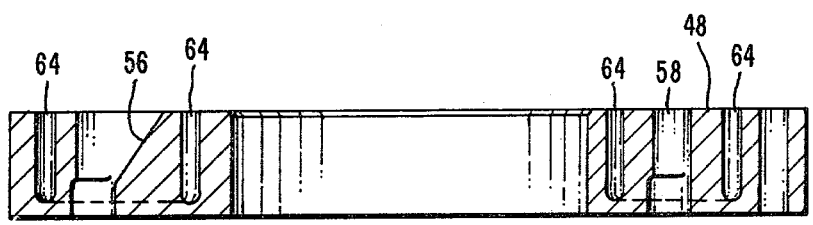
FIG. 5 is a sectional view taken along the line V—V of FIG. 4.
Figure 7:
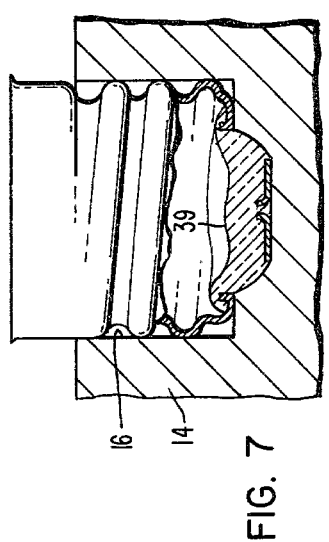
FIG. 7 is a sectional view of a nest containing the lamp base after receiving a gob of glass.
Figure 6:
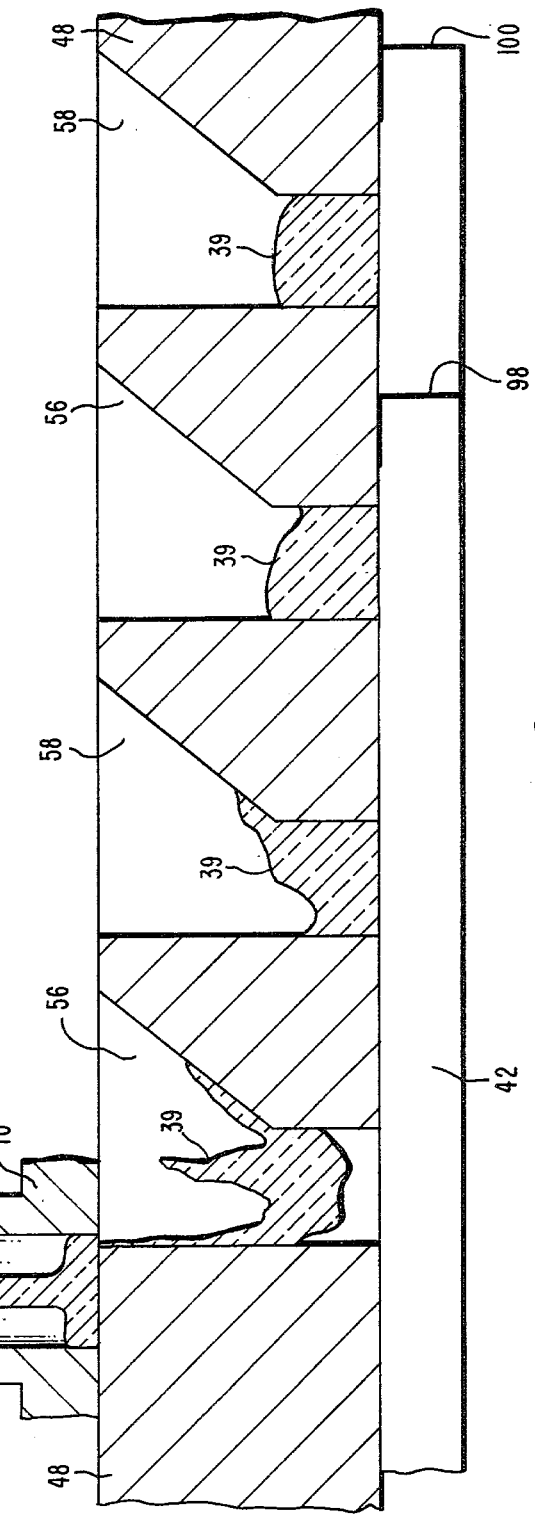
FIG. 6 is a schematic view illustrating the delivery of glass through the dial.

As best illustrated in FIGS. 4 and 5 the dial cover plate 50 is secured to the water cooled dial 48 by a plurality of bolts 52. The cover plate 50 includes twelve identical elongated apertures 54 therein with the openings in the apertures 54 in the top plate being located on a first circular locus radially equidistant from the center of the dial and equidistantly spaced one from the other on that locus. The apertures 54 communicate with chambers 56 and 58 in the water cooled dial 48. The chambers 56 and 58 are differently shaped and include at their bottom end an aperture 60–62 in the bottom surface of the water cooled dial 48. The apertures 62 associated with the chambers 58 are located essentially on the same circular locus as the openings or apertures in the top surface of a dial cover plate 50 with the apertures 60 associated with the chambers 56 being located on a second circular locus which locus is radially equidistant from the center of the dial but being a greater distance from the center of the dial then the first circular locus. As will be apparent as the description proceeds, gobs of glass are delivered from the chambers 56 to the inner circle of nests on the turret and to nests of the outer circle of the turret from the chambers 58. The rotary dial includes alternately therein six of the chambers 56 and six of the chambers 58.

The dial 50 also includes a plurality of circular channels 64 which surround each of the chambers 56 and 58. These channels carry continuously flowing coolant in form of water which enters the series of circular channels at 66 and exits therefrom at 68 after traversing each of the ring channels 64 which surround the chambers 56 and 58. Water is delivered to the channels 64 and returned therefrom by means of horizontal conduits 65 and 67, respectively, in the dial cover plate 50 which interconnect with a conventional rotary valve 69. Cooling water enters the rotary valve through conduit 71, proceeds through conduit 65 and channels 64 to return line 67 and then exits through conduit 73. The operation of the rotary valve will be readily apparent to one of ordinary skill in the art. Cooling the rotary dial maintains a uniform dial temperature and prevents sticking of glass to dial.

The glass stream 39 enters the gob feed mechanism through a fill bushing 70 which is pivotally mounted to the support 40 at 72 by a fill bushing support member 74 which permits the fill bushing to ride on the top plate 50 while being located on the same circular locus as the apertures 54 in the top plate 50. Water inlet line 76, conduit 77 in the fill bushing support 74 and water outlet line 78 permit cooling of the fill bushing 70, again to prevent the glass from sticking to the fill bushing.

A gob delivery chute block 80 is mounted by means of the delivery chute block support strap 82 to the support member 40. The gob delivery chute block 80 includes a first curved delivery chute or aperture 84 and a second curve delivery chute or aperture 86 each extending therethrough which serve as guides for the gobs of glass as they leave the bottom openings 60 and 62 respectively in the rotary dial 48. A gob leaving the bottom opening 60 in the chamber 56 will be delivered through the chute or aperture 84 into a nest on the inner circle of nests 16 while a gob leaving the bottom opening 62 in a chamber 58 will be delivered through delivery chute or aperture 86 into the outer circle of nests 16. The chutes 84 and 86 are essentially guides for the freely falling gobs of glass and closely approximate the free fall trajectory of a gob released from the rotating dial at a speed of approximately 30 revolutions per minute. The gob delivery chute block 80 may also be water cooled if desired.

An air blow system is provided and may be utilized when it is necessary to add some impetus to the removal of the glass gob from the bottom openings 60 and 62 of the dial. This is accomplished through an air delivery system which includes the air blow pipe 88 mounted to the post 90 through the pivot 92 which permits air to be blown through the orifices 94 and 96 which overlie the openings 54 in the top plate 50. As the bottom openings of their associated chambers reach their respective discharge openings.

In operation, the turret 14 is indexed at a rate of 180 indexes per minute which permits the manufacture of 360 bases per minute because of the pairs or sets of nests 16 at each index position. In order to deliver 360 gobs of glass per minute the water cooled dial must therefore rotate at 30 revolutions per minute. As glass is delivered from the glass furnace in the form of glass stream 39 into the fill bushing 70, the gob begins to build up on the top plate 50 until an orifice or opening 54 intersects the fill bushing at which point the built up glass as well as the continuing stream falls through the opening 54 in top plate 50 into the chamber 56 or 58 associated with that opening in the top plate. The glass moves downwardly and rewardly as in the case of the chamber 58 or laterally outwardly as in the case of the chamber 56 as well as rewardly. As illustrated in the schematic FIG. 5, the glass gob falls to the bottom of the chambers 56 and 58 through approximately 90° of rotation of the dial 48 until the bottom openings 60 and 62 come to the portion of the edge of wear plate 42 designated 98 and 100 where there is no longer a wear plate closing the bottom openings 60 and 62 in the chambers 56 and 58 at which point the ball-like gob of glass is permitted to exit from the chambers 56 and 58 into the gob guide chute block containing guide chutes 84 and 86 for delivery from the guide chute 86 into an outer nest 16 or from the guide chute 84 into an inner nest 16. As will be apparent from FIGS. 2 and 3, the guide chute 84 delivers its gob of glass to the inner nest of the index station immediately preceeding the index station at which guide chute 86 delivers its gob of glass to the outer nest.

As will be apparent from the foregoing, a single stream of molten glass is severed into gobs of predetermined size and delivered to a pair of laterally spaced nests on the lamp base making machine indexing turret by means of the gob feed dial of this invention. The gobs of glass are fed alternately to the two different laterally spaced locations while the dial is rotating due to the configuration of the alternate chambers in the dial body. More specifically, every other chamber, the chambers 56 and 58, respectively, are designed to move the gob radially outwardly from the center of the disc as the disc rotates from the glass receiving position to the gob discharge position while the alternate gob travels on the same circular locus on which it is received to its subsequent discharge location. With the base making machine turret 14 indexing at 180 indexes per minute and the dial 48 rotating at 30 revolutions per minute, a gob of glass will be delivered to each of the 72 nests during six revolutions of the gob feed dial. Of course, these speeds are preferable, but it should be understood that increased rates of speed are possible without departing from the scope of this invention.

What is claimed is:

1. The method of delivering insulating glass to a lamp base making machine comprising the steps of:
    repetitively severing a continuous stream of molten glass into gobs of uniform weight and size with a continuously rotating dial having a plurality of apertures in the upper surface thereof;
    forming said gobs of uniform weight and size into a ball-like shape while conveying said gobs sequentially to a pair of radially different discharge locations, a first of said radially different discharge locations being spaced the same radial distance from the center of said dial as said plurality of apertures in said upper surface and the other of said radially different discharge locations being radially outward of said first radially different discharge location; and
    blowing air into said apertures in the upper surface of said rotating dial when discharging said ball-like gobs from said rotating dial at said pair of radially different discharge locations.

2. The method of claim 1 wherein said gobs of glass of uniform weight and size are discharged simultaneously at said discharge locations into nests on an indexing turret of said lamp base making machine.

3. The method of claim 1 wherein said gobs are guided to a lamp base shell location when discharged from said rotating dial.

4. The method of claim 1 wherein said dial rotates approximately 90° from the point at which said glass stream is severed to the point at which said gobs are discharged from said rotating dial.

5. An apparatus for forming and delivering insulating glass to a lamp base making machine, said apparatus comprising:
    a circular dial having top and bottom surfaces and a plurality of chambers therein, each of said chambers having an opening in said top and bottom surfaces, said openings in said top surface of said dial being located on a first circular locus radially equidistant from the center of said dial, said openings in said bottom surface being alternately located on said first circular locus and on a second circular locus which is radially equidistant from the center of said dial but being a greater distance from the center of said dial then said first circular locus;
    a dial support having a wear plate mounted to the top thereof and a central aperture through said dial support and said wear plate;
    a dial drive shaft extending through said aperture in said dial support and said wear plate having said dial mounted thereon for rotation therewith;
    glass stream receiving means positioned over said first locus on said dial for receiving and directing a continuous stream of glass into said openings in said top surface of said dial, said wear plate being constructed and arranged to close off the openings in said bottom surface of said dial for a portion of the rotation thereof thereby containing said insulating glass within said chambers for a portion of said rotation. With the intersection of said openings in said bottom surface and an edge of said wear plate defining a pair of glass discharge locations.

6. The apparatus according to claim 5 wherein a gob guide chute block having gob guide apertures therethrough is mounted to said dial support with sad gob guide apertures constructed and arranged to underlay said openings in said bottom surface of said dial at said discharge locations.

7. The apparatus according to claim 5 wherein cooling channels are provided in said dial surrounding said chambers.

8. An apparatus for forming and delivering insulating glass to an indexing turret on a lamp base making machine, said apparatus comprising:
    a dial support having a horizontally disposed wear plate forming the upper surface thereof and an elongated vertically disposed aperture extending through said dial support and said wear plate;
    a dial drive shaft mounted for rotation within said vertical aperture in said dial support and extending at its upper end through said wear plate;
    a circular dial mounted to said upper end of said dial drive shaft for rotation therewith, said circular dial having top and bottom surfaces with said bottom surface in intimate contact with said wear plate for a portion of each revolution;
    a plurality of chambers in said circular dial, each of said chambers having an opening in said top and bottom surfaces, said openings in said top surface of said dial being located on a first circular locus radially equidistant from the center of said dial, said openings in said bottom surface being alternately located on said first circular locus and on a second circular locus which is radially equidistant from the center of said dial but being a greater distance from the center of said dial then said first circular locus;
    a gob guide chute block mounted to said dial support having gob guide chutes apertures and constructed and arranged to underlie said openings in said bottom of said circular dial at a location adjacent an edge of said wear plate whereby glass gobs released from said chambers in said circular dial through said bottom openings will be directed by said gob guide chutes to preselected locations on said indexing turret.

9. The apparatus according to claim 8 wherein said circular dial includes cooling channels surrounding each of said chambers, said cooling channels having continuously circulating coolant therein.

10. The apparatus according to claim 8 wherein two adjacent chambers having bottom openings on different circular loci are constructed and arranged to release gobs of glass simultaneously.

* * * * *